United States Patent
Thome et al.

(10) Patent No.: US 11,983,091 B2
(45) Date of Patent: May 14, 2024

(54) ADAPTIVELY GENERATED PROGRAM MODEL

(71) Applicant: GitLab B.V., Amsterdam (NL)

(72) Inventors: Julian Thome, Esch-sur-Alzette (LU); Isaac Dawson, Yokohama (JP); James Johnson, Sammamish, WA (US); Zach Rice, Riverside, IL (US); Daniel Searles, Spearfish, SD (US); Lucas Charles, Portland, OR (US); Mark Art, San Francisco, CA (US); Taylor McCaslin, Bozeman, MT (US); Thomas Woodham, Greer, SC (US); Todd Stadelhofer, Portland, OR (US)

(73) Assignee: GitLab B.V., Amsterdam (NL)

(*) Notice: Subject to any disclaimer, the term of this patent is extended or adjusted under 35 U.S.C. 154(b) by 85 days.

(21) Appl. No.: 17/705,190

(22) Filed: Mar. 25, 2022

(65) Prior Publication Data
US 2023/0305942 A1    Sep. 28, 2023

(51) Int. Cl.
*G06F 9/44*    (2018.01)
*G06F 8/71*    (2018.01)
*G06F 11/36*    (2006.01)

(52) U.S. Cl.
CPC .......... *G06F 11/3608* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 9,197,665 B1 | 11/2015 | Cabot et al. | |
| 9,703,689 B2 * | 7/2017 | Amano | G06F 11/3684 |
| 10,970,183 B1 | 4/2021 | Aberg et al. | |
| 2006/0085681 A1 * | 4/2006 | Feldstein | G06F 11/3692 714/25 |
| 2008/0028364 A1 * | 1/2008 | Triou | G06F 11/3676 717/124 |

(Continued)

OTHER PUBLICATIONS

PCT International Search Report and Written Opinion, PCT Application No. PCT/IB23/51335, dated May 12, 2023, 10 pages.

(Continued)

*Primary Examiner* — Wei Y Zhen
*Assistant Examiner* — Lanny N Ung
(74) *Attorney, Agent, or Firm* — Fenwick & West LLP (57) ABSTRACT

A system and method to adaptively generate a program model. Source code of a program to be tested for code issues, and a set of predefined patterns to be tested in the source code are received. Feature configuration data is generated by determining a set of features corresponding to the received set of predefined patterns. A set of program models is identified by selecting, for each feature in the set of features, a program model from among a plurality of program models that is optimized for the feature. A dynamic program model is built based on the identified set of program models, the dynamic program model being adapted to resolve each of the patterns included in the received set of predefined patterns. And the source code is tested for code issues by extracting from the dynamic program model instances of each of the set of predefined patterns.

18 Claims, 4 Drawing Sheets

(56) References Cited

U.S. PATENT DOCUMENTS

| | | | |
|---|---|---|---|
| 2015/0220308 A1* | 8/2015 | Condon | G06F 8/20 717/104 |
| 2015/0309813 A1 | 10/2015 | Patel | |
| 2021/0173760 A1 | 6/2021 | Downie et al. | |
| 2022/0043848 A1* | 2/2022 | Hsiao | G06F 16/3347 |

OTHER PUBLICATIONS

Aho, A.V. et al., "Compilers, Principles, Techniques, & Tools," Pearson, 2006, 15 pages (with cover page, table of contents and relevant portions of Chapters 1 and 9).

Hammer, C., "Information Flow Control for Java: A Comprehensive Approach Based on Path Conditions in Dependence Graphs," Karlsruhe University, Jul. 1, 2009, ISBN: 978-3-86644-398-3, pp. 1-221.

* cited by examiner

ADAPTIVELY GENERATED PROGRAM MODEL

TECHNICAL FIELD

The subject matter described relates generally to adaptively generating a program model and, in particular, to building a program model that improves efficacy and performance by selectively providing models used for identifying patterns by means of static analysis.

BACKGROUND

Many entities manage software projects using Source Code Management (SCM) systems (such as Git). As code is written and modified, code issues (e.g., security vulnerabilities, code-smells, coding standard violations, insecure flows, secrets, and the like) inevitably arise. Entities often apply automated testing processes that monitor the changing code to detect these issues as early as possible in the software development process. One example of automated testing processes are static analysis tools (e.g., static application security testing (SAST) tools) that can automatically detect code issues in the source code or compiled code of a software project. Static analysis tools are typically language and problem (e.g., based on type of code issue) specific. For example, some static analysis tools can detect secrets (e.g., hardcoded passwords) in the source code, while other tools are focused on detecting potentially insecure flows, etc. Thus, entities may employ multiple static analysis tools in combination to reduce the overall attack surface of the software. Each static analysis tool may analyze the source or compiled code, and report detected code issues for further analysis (e.g., by a human security analyst). However, many existing static analysis tools require building large, resource intensive models that limit the usability of such tools.

SUMMARY

Embodiments relate to a system and method for dynamically building a program model with an appropriate level of granularity based on user-defined patterns to be extracted from a program model. In one embodiment, a system for adaptively generating a program model is provided which includes: one or more processors; and memory operatively coupled to the one or more processors, the memory comprising instructions that, when executed by the one or more processors, cause the one or more processors to: receive source code of a program to be tested for code issues; receive a set of predefined patterns to be tested in the source code; generate feature configuration data by determining a set of features corresponding to the received set of predefined patterns; identify a set of program models by selecting, for each feature in the set of features, one or more program models from a plurality of program models that are needed to evaluate the feature; build a dynamic program model based on the identified set of program models, wherein the dynamic program model is adapted to resolve each of the patterns included in the received set of predefined patterns; and test the source code for code issues by extracting from the dynamic program model instances of each of the set of predefined patterns.

In another embodiment, a method for adaptively generating a program model is provided which includes the steps of: receiving source code of a program to be tested for code issues; receiving a set of predefined patterns to be tested in the source code; generating feature configuration data by determining a set of features corresponding to the received set of predefined patterns; identifying a set of program models by selecting, for each feature in the set of features, a program model from among a plurality of program models that is optimized for the feature; building a dynamic program model based on the identified set of program models, wherein the dynamic program model is adapted to resolve each of the patterns included in the received set of predefined patterns; and testing the source code for code issues by extracting from the dynamic program model instances of each of the set of predefined patterns.

In yet another embodiment, the method may be embodied in computer executable program code and stored in a non-transitory storage device (computer-readable recording medium).

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

To analyze source code or compiled code, most static analysis tools build a program model of the source or compiled code of the program. The tool is then able to identify the code issues it is designed to detect by extracting context specific information (e.g., patterns) from the program model. The analysis that can be performed by the tool varies based on the level of detail which the underlying program model provides. And the level of detail of the program model has a significant impact on efficacy and performance of the static analysis tool and of the underlying program model. That is, the more aspects (e.g., features) of a program are supported by the program model, the larger or more multifaceted the program model will become. And this complexity can lead to a reduction in performance, but an increase in efficacy. On the other hand, if certain aspects of the program are not going to be tested by the static analysis tool, it is unnecessary to provide built-in support for such aspects in the program model, thereby increasing performance. It is desirable to build a program model that is free from redundancies (which improves performance) and that also has high efficacy.

The term "true positive" or "TP" refers to an instance when a static analysis tool (e.g., analytical approach) correctly identifies an issue (e.g., code issue). The term "true negative" or "TN" refers to an instance when a static analysis tool correctly ignores a non-issue. The term "false positive" or "FP" refers to an instance when a static analysis tool falsely reports an issue (e.g., code issue). The term "false negative" or "FN" refers to an instance when a static analysis tool falsely ignores an issue.

The term "efficacy" refers to capabilities of a static analysis tool (e.g., analysis approach). A static analysis tool has a high efficacy if it produces a high number of TPs and TNs while minimizing FPs and FNs. Conversely, a static analysis tool has a low efficacy if it produces a high number of FPs and FNs with a relatively low number TPs and TNs.

The term "performance" may refer to runtime (e.g., processing power), space (e.g., main memory, hard disk, and the like) requirements (e.g., of a static analysis tool, of building a program model, and the like), or both. For example, a high performance denotes little space requirements and a fast execution time whereas low performance denotes high space requirements and a slow execution time.

The term "pattern" refers to information that should be extracted from a program model. For example, patterns can be formulated in terms of queries, as code fragments, or they can appear as comments in the source-code. Using SQL databases as an analogy, the SQL query itself can be considered as a pattern.

The term "instance" refers to a concrete sub-set of a program model that is extracted by the application of a pattern. Using SQL databases as an analogy, a result yielded by the application of an SQL query can be considered as an instance.

This disclosure pertains to a system and method for adaptively generating a program model for static analysis of source or compiled code of a program to identify code issues (e.g., security vulnerabilities, code-smells, coding standard violations, insecure flows, secrets, and the like) in the program. Conventional static analysis tools force generation of fixed program models based on a generic classification of analytical approaches (e.g., linting-based approach, intraprocedural analysis-based approach, interprocedural analysis-based approach, and the like) for software testing. By contrast, a static analysis tool according to the present disclosure adaptively or dynamically generates a program model with an appropriate level of granularity (e.g., appropriate set of supported features or aspects of the program to be tested) based on user-defined patterns to be extracted from the program model (e.g., based on the type of test to be performed on the software program).

Techniques disclosed herein may determine the type of information that is requested by user selected patterns and generate/extract a set of corresponding features (e.g., aspects) that, if supported by a program model underlying the tool, enable extraction of instances of the patterns. Techniques disclosed herein may use predefined relationships between features and program models that have such features. In various embodiments, a code scanner (e.g., static analysis tool) according to the present disclosure generates a program model that can resolve all patterns that are defined by the user for extraction from the code. By selectively building the program model that has features based on user selected patterns in the source code, pre-computation and analysis of redundant data by the code scanner is avoided, thereby improving performance of subsequent analysis steps while maintaining the efficacy, and further making the program model scale well which is especially important in resource constrained environment such as continuous integration (CI) or continuous deployment (CD) environments.

Figure 1:
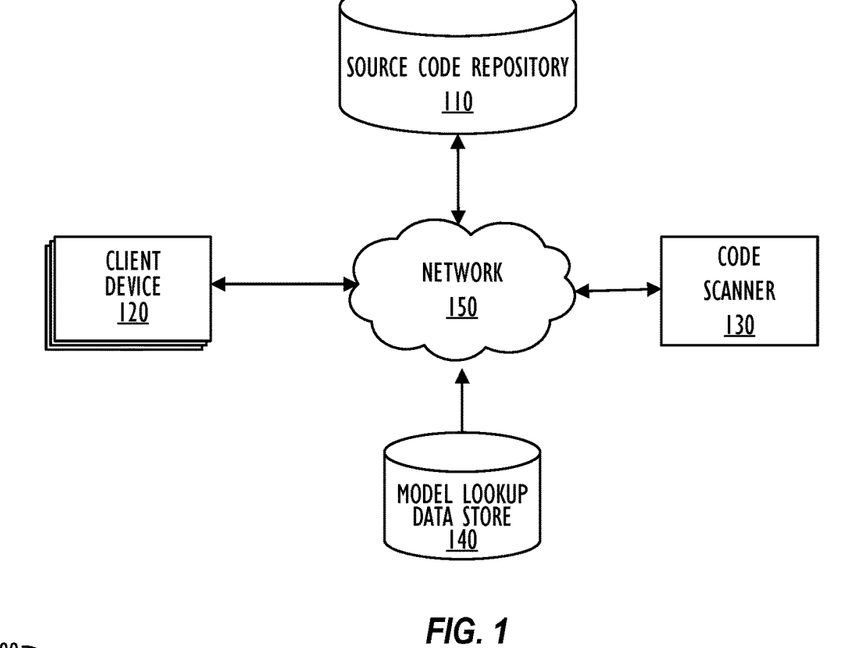
FIG. 1 is a block diagram of a networked computing environment suitable for managing the code of a software project, according to one embodiment.

FIG. 1 illustrates one embodiment of networked computing environment 100 suitable for managing the code of a software project. In the embodiment shown, the networked computing environment 100 includes source code repository 110, one or more client devices 120, code scanner 130, and model lookup data store 140, all connected via network 150. In other embodiments, networked computing environment 100 includes different or additional elements. In addition, the functions may be distributed among the elements in a different manner than described. For example, although source code repository 110 and model lookup data store 140 are shown as distinct entities, in some embodiments the corresponding functionality is provided by the same storage device of a single computing system (e.g., a server).

The source code repository 110 includes one or more computer-readable storage media that store the code for one or more software projects. In one embodiment, the source code repository 110 stores the code for a SCM system. The SCM system may store multiple versions of the code for the software project to enable updates to be rolled back and developers to review the historical status of the code, etc.

Client devices 120 are computing devices with which software engineers may edit code and commit updates to code repository 110. For example, a client device 120 may be a desktop workstation with which an engineer downloads a portion of code from source code repository 110, makes and tests revisions in a development environment, and uploads the revised code to source code repository 110. Multiple engineers may each use a corresponding client device 120 to revise code and commit those revisions to source code repository 110 at any given time. Known suitable techniques may be used to manage conflicts between updates made to the code by different engineers at approximately the same time. As will be described in more detail later, engineers may also use client devices 120 to input patterns that are to be extracted from the source code during testing.

Code scanner 130 continuously or periodically (e.g., hourly, daily, etc.) scans the code in source code repository 110 to identify code issues (e.g., security vulnerabilities, code-smells, coding standard violations, insecure flows, secrets, and the like). In one embodiment, code scanner 130 includes one or more static analysis tools (e.g., having one or more program analysis approaches). Each static analysis tool scans the code (or portions of the code) in a programming language the tool is intended to be used with to identify predetermined types of code issues. The static analysis tools may generate reports with information regarding identified code issues. Each static analysis tool may generate a report including all the code issues identified after scanning the code (or a specified portion of the code). Alternatively, the static analysis tool may generate an individual report about each identified code issue (e.g., immediately after identifying it). The static analysis tools are generally evaluated based on metrics including TPs, TNs, FPs, FNs, efficacy, and performance.

As input, code scanner 130 takes from source code repository 110, the source code of a program, and from client device(s) 120, a set of predefined patterns to be extracted from the source code during testing. Code scanner 130 further takes as input, model lookup data from model lookup data store 140 to generate a dynamic program model with the level of granularity demanded as per an identified set of features extracted from the set of predefined patterns input by the user (e.g., by input through client devices 120). Model lookup data store 140 includes one or more computer-readable storage media that store predefined (model lookup) data (e.g., lookup table) indicating relationships between features (e.g., aspects) and program models (e.g., program models shown in FIG. 2) that have or that provide support for such features. Structural and operational details of code scanner 130 are provided below in connection with FIGS. 3-4.

Network 150 provides the communication channels via which the other elements of networked computing environment 100 communicate. Network 150 can include any combination of local area and wide area networks, using wired or wireless communication systems. In one embodiment, network 150 uses standard communications technologies and protocols. For example, network 150 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over network 150 may be represented using any suitable format, such as hypertext markup language (HTML) or extensible markup language (XML). In some embodiments, some or all of the communication links of network 150 may be encrypted using any suitable technique or techniques.

Figure 2:
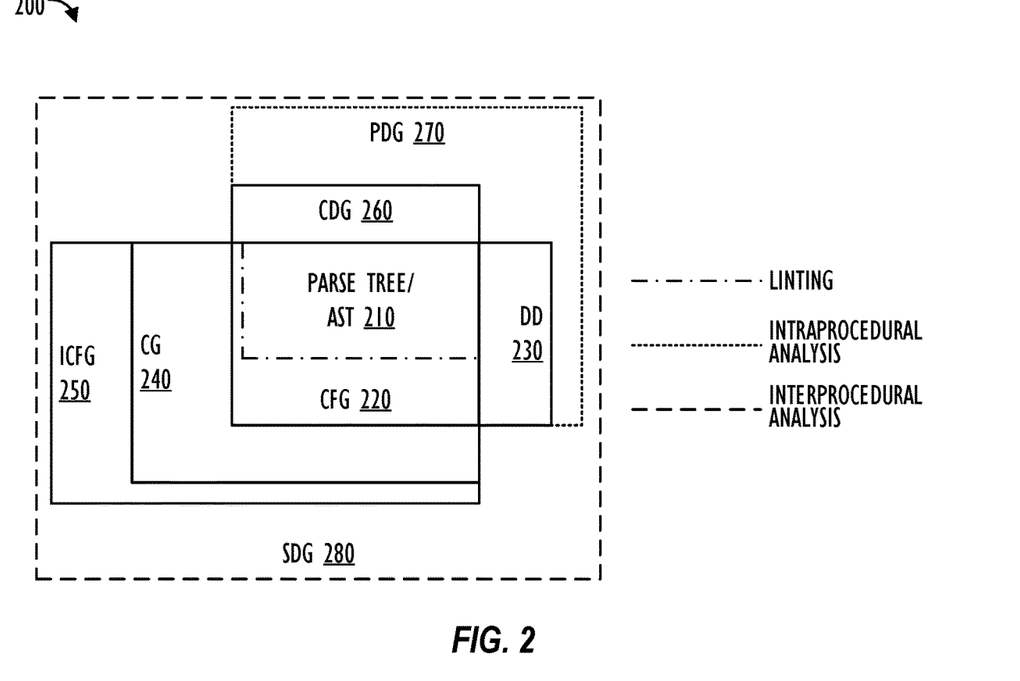
FIG. 2 is a block diagram illustrating exemplary program models, dependencies of the program models, and analytical approaches related to the program models.

FIG. 2 is a block diagram showing exemplary program models, dependencies of the program models, and general program analysis approaches related to the program models. As explained previously, static analysis tools build a program model of the source or compiled code prior to analysis. The tool then extracts patterns from the model and evaluates the patterns to identify code issues. The analysis approach (e.g., type of test) of the static analysis tool varies based on the level of detail which the underlying built program model provides. Also, the program model that is being used by the static analysis tool has a significant impact on its efficacy and performance.

There exist many different standard program models that are used by static analysis tools as well as compilers. Most are based on graphs that model different aspects of a program in terms of nodes and edges. FIG. 2 shows examples of different program models that may be used by static analysis tools. The models shown in FIG. 2 are illustrative examples of program models, and not intended to be a (limiting) comprehensive list of program models. A person of ordinary skill in the art will appreciate that the set of program models to be used according to the present disclosure can be adapted towards program models that are not shown in FIG. 2.

The program models 210-280 of FIG. 2 are described in detail below. Further, as shown in FIG. 2, the different program models (represented as boxes 210-280) are layered. If a program model $M_2$ is a dependency of, or subsumed by another program model $M_1$, the box of $M_2$ is embedded in the box of $M_1$.

Parse Tree (or Abstract Syntax Tree (AST)) 210 is a hierarchical presentation of the source code produced by a parser. Control-Flow Graph (CFG) 220 is a graph that represents the (intraprocedural) control-flow of a program. CFG 220 depends on parse tree 210. Data Dependence Graph (DD) 230 is a graph that captures (intraprocedural) data flow in a program. For example, if a statement/expression computes a value and stores it in a variable x and this variable is used in another expression y, there is a data dependence between x and y. DD 230 depends on CFG 220.

Call Graph (CG) 240 is a graph that represents the call-hierarchy within a program. CG 240 depends on CFG 220. Interprocedural Control-Flow Graph (ICFG) 250 is an interprocedural control-flow graph. ICFG 250 depends on CG 240. Control Dependence Graph (CDG) 260 is a control-dependence graph that models control dependency. For example, if a statement $s_1$ controls the execution of another statement $s_2$, $s_2$ is control-dependent on $s_1$. CDG 260 depends on CFG 220. Program Dependence Graph (PDG) 270 is a combination of data-dependence and control dependence graphs. PDG 270 depends on DD 230 and CDG 260. System Dependence Graph (SDG) 280 includes PDGs 270 that are connected by interprocedural edges. SDG 280 depends on PDG 270 and ICFG 250. As is evident from FIG. 2, program models 220-280 are transitively dependent on parse tree 210 which can be considered to be a relatively shallow program representation. SDG 280 is the most precise model that transitively depends on and, hence, encompasses all the other program models 210-270.

Generally, static analysis approaches (e.g., of different static analysis tools) can be roughly divided into three categories, linting-based analysis approach, intraprocedural analysis approach, and interprocedural analysis approach. Out of the three types of approaches, the linting-based analysis approach is relatively low in complexity (relatively less sophisticated than the other two approaches), the intraprocedural analysis approach is relatively medium in complexity, and the interprocedural analysis approach is relatively high in complexity (relatively more sophisticated than the other two approaches).

static analysis tools that fall under or that apply the linting-based analysis approach utilize a program model that is usually very shallow and geared towards detecting patterns on the lexical or parse tree level. Linting-based analysis approaches are generally lightweight which makes them very performant. Among the exemplary program models shown in FIG. 2, parse tree model 210 would be a suitable program model for this type of analysis. static analysis tools that fall under or that apply the intraprocedural analysis approach utilize a program model that enables performing analysis within the context of a function which makes them unable to capture data and control-flow beyond the boundaries of a function. Among the exemplary program models shown in FIG. 2, models that are subsumed by PDG 270 would be a suitable program model for this type of analysis. static analysis tools that fall under or that apply the interprocedural analysis approach utilize a program model that enables analysis beyond function boundaries. In comparison to the other techniques, interprocedural analysis considers more aspects of the program and is, thus, the relatively more comprehensive analysis technique (out of the three approaches described above). Among the exemplary program models shown in FIG. 2, ICFG 250, CG 240 and SDG 280 would be suitable models for this type of analysis.

As explained above and in connection with FIG. 2, the three analysis approaches (or corresponding static analysis tools) require different program models with different levels of granularity. In general, the more sophisticated the analysis, the higher its demands with regards to the granularity of the underlying program model. While linting-based approaches may operate on parse tree 210, intraprocedural approaches require program models with a level of granularity that ranges somewhere between parse tree 210 and PDG 270, and interprocedural approaches require a model with a level of granularity that ranges somewhere between PDG 270 and SDG 280, which can be considered the most sophisticated program model out of the models shown in FIG. 2, i.e., a program model that represents most of the features of the original program. However, the level of complexity of an analysis approach (or corresponding static analysis tool) and the program model has an impact on both performance and efficacy.

In general, the more sophisticated an approach or static analysis tool is, and the higher the complexity of the underlying program model is, the higher its efficacy and the lower its performance. Thus, the linting-based approach has a relatively low potential efficacy and relatively high potential performance. The linting-based approach, as a shallow analysis technique, scales well to large programs since the model as well as the analysis are simplistic (i.e., relatively high performance). On the downside, it models very few aspects/features of the program leading to a relatively low efficacy. On the other end of the spectrum, the interprocedural analysis approach has a relatively high potential efficacy and a relatively low potential performance. The interprocedural analysis approach utilizes a very rich program model that encompasses many aspects/features of the program. Due to the rich (high level of detail) program model, this analysis technique requires more resources (i.e., relatively low performance) making it less scalable towards large codebases in comparison to linting-based techniques. However, due to the richness of the program model, it is also less prone to FNs and FPs and has, thus, a relatively higher efficacy. Intraprocedural analysis is in the middle of the spectrum with medium efficacy and performance.

Further, the performance constraint imposes a limitation on the context in which these different approaches are applicable. For example, linting-based approaches work well in integrated development environments (IDE) and CI/CD environments because they are fast and provide feedback quickly. Intraprocedural approaches can also work as local tools that help developers find code issues (e.g., security vulnerabilities) in their code. Whereas interprocedural approaches are not the best fit for CI/CD environments due to their performance limitation which could reduce developer velocity and productivity in a CI/CD setting. Hence, interprocedural analysis is often provided as a dedicated service which runs on server farms or dedicated tooling that is to be executed locally by developers on high-end development machines. In summary, conventionally, each analysis approach or corresponding static analysis tool (e.g., linting-based analysis approach or tool, intraprocedural analysis approach or tool, interprocedural analysis approach or tool) is designed and built for a specific application context and relies on a fixed program model.

By forcing a particular program model to be used, the versatility in which environments these analysis tools can be used is lost. This is especially true for environments that are constrained with respect to performance such as CI/CD. For example, interprocedural approaches that provide the relatively highest level of efficacy are hardly applicable due to the performance limitations of CI/CD environments. Further, by forcing a particular program model, features or aspects that are not necessarily being tested or used by the tool may be built into the program model, thereby reducing performance.

To overcome the above problems, the present disclosure describes a system and method for dynamically building a program model with an appropriate level of granularity based on user-defined (anti)-patterns to be extracted from the program model. Not pre-computing and analyzing redundant data can improve the performance of the subsequent analysis steps while maintaining the efficacy. The adaptive static analysis and dynamic program model generation by code scanner 130 breaks up the conventional distinction between linting, intraprocedural and interprocedural analysis approaches (and forced generation of corresponding program models) by automatically adapting the granularity of the dynamic program model towards its use-case (e.g., based on user input pattern data; based on the type of tests to be performed on the code). That is, code scanner 130 dynamically adjusts the granularity of the dynamic program model to be built based on the level of detail/granularity demanded by the patterns to be extracted from the model, which makes the analysis approach scale well to CI/CD environments because the program model is free from redundancies (which improves performance) without sacrificing efficacy. The adaptive program model approach according to the present disclosure thus provides a practical trade-off between efficacy and performance.

Figure 3:
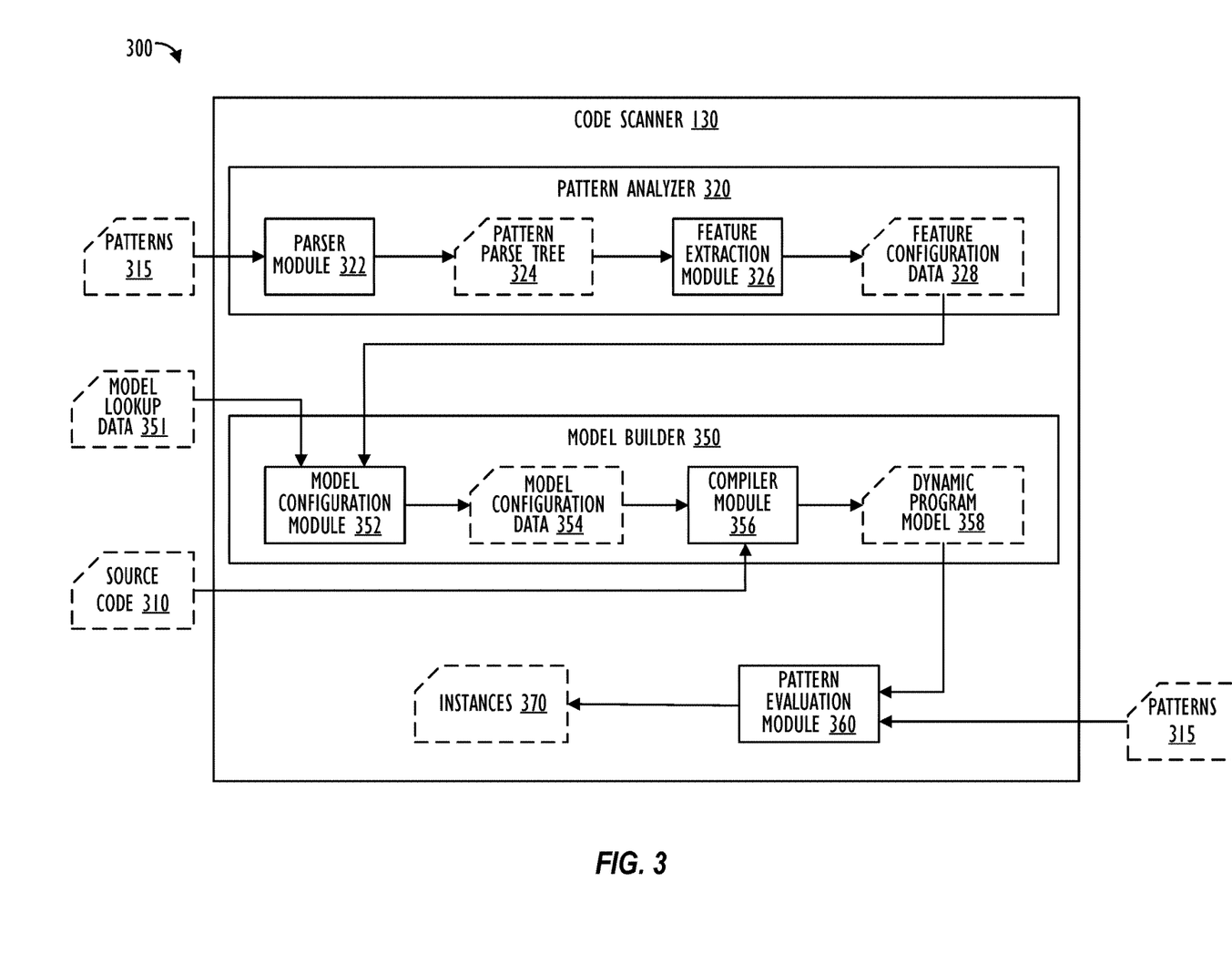
FIG. 3 is a block diagram of the code scanner shown in FIG. 1, according to one embodiment.

Details of the adaptive program model generation approach of the code scanner 130 are provided below in connection to FIGS. 3-4. FIG. 3 is a data flow diagram 300 and block diagram of code scanner 130 shown in FIG. 1, according to one embodiment. As shown in FIG. 3, code scanner 130 implementing the adaptive model generation approach includes pattern analyzer 320, model builder 350, and pattern evaluation module 360. Pattern analyzer 320 includes parser module 322 and feature extraction module 326, and model builder 350 includes model configuration module 352 and compiler module 356. In other embodiments, code scanner 130 includes different or additional elements. In addition, the functions may be distributed among the elements in a different manner than described. For example, although pattern analyzer 320 and model builder 350 are shown as separate elements, in some embodiments the corresponding functionality is provided by a single computing system (e.g., a server). Data flow diagram 300 of FIG. 3 also shows flow of data into code scanner 130, and among components of code scanner 130. As shown in FIG. 3, code scanner 130 takes as input, source code 310, patterns 315, and model lookup data 351. Source code 310 may be the code (or specified portion of the code) of a program that is obtained from source code repository 110 of FIG. 1, and that is to be tested for code issues (e.g., security vulnerabilities, code-smells, coding standard violations, insecure flows, secrets, and the like) by (adaptively) building a program model thereof and running analysis on the program model.

Patterns 315 include a set of predefined patterns (e.g., specified by a user using client devices 120 of FIG. 1) that are to be extracted from the program corresponding to source code 310 during the subsequent analysis and testing. Patterns 315 input to code scanner 130 may be pre-filtered to remove those that are not needed or are inappropriate for the context. For example, if interprocedural analysis is not available, patterns that require interprocedural analysis may be filtered out. Model lookup data 351 may be data that is received from model lookup data store 140, and that includes predefined data (e.g., lookup table) indicating relationships between the features and program models (e.g., program models shown in FIG. 2) that have or that provide support for such features.

Examples of different program patterns 315 (and corresponding relationships between patterns, features, and program models) selectable by a user for input to code scanner 130 are provided below by means of instances. In the examples below, program patterns 315 are grouped by corresponding features with distinctions provided between features. While some exemplary patterns, corresponding exemplary features, and corresponding exemplary program models are described below, the adaptive model generation technique according to the present disclosure is not limited to such patterns, features, and models. A person of ordinary skill in the art will appreciate that the adaptive model generation technique of the present disclosure can be applied to other patterns, features, and models as well.

During testing, information requested by a pattern requires certain features to be baked into the program model itself to be able to adequately solve/answer/execute the pattern in the first place. In the example program patterns below, the corresponding feature and the corresponding program model required to be able to extract the pattern are also identified for each program pattern.

Parse tree/AST hierarchy feature: Parse tree pattern extraction is one of the simplest forms of static analysis because it relies on the parse tree as the basis of the program model and can be generated by a parser without any further computation. Information that can be extracted from the parse tree include variable/class/struct/interface names, and hierarchical information.

The snippet below (Pattern Example 1) is a code instance from a Ruby on Rails application with the pattern being highlighted in bold.

validates:email, presence: true, format: {with: URI::MailTo:EMAIL_REGEXP}

Pattern Example 1

Pattern Example 1 can be detected by means of a parse tree traversal. That is, to extract a pattern like Pattern Example 1 from a program, the underlying program model must have the parse tree/AST hierarchy feature. The parse tree model 210 of FIG. 2 is sufficient to satisfy/extract the pattern shown in Pattern Example 1.

Static type information feature/dynamic type information feature: Type information is useful to extract patterns based on the (return-) types of variables, methods, and functions. The complexity of computing types varies based on the programming language. Generally, the complexity variation can be said to be between statically and dynamically typed programming languages. More specifically, given that statically typed languages provide type information explicitly in the source code, inferring types for statically typed languages is less expensive/involved as compared to dynamically typed languages.

The pattern example below (Pattern Example 2) shows a snippet written in the programming language Go, a statically typed language. In Pattern Example 2, the code is looking for all functions that return error types. Since with Go, the return values of a function must be typed explicitly, the parse tree is sufficient to extract the types from the signatures.

```
func foo(arg string) error {
    if arg == "1" {
        return fmt.Errorf("error")
    }
    return nil
}
Pattern Example 2
```

Patterns like the above Pattern Example 2 can be detected by means of a parse tree traversal. That is, to be able to extract a pattern like Pattern Example 2, the underlying program model must have the static type information feature. The parse tree model 210 of FIG. 2 is sufficient to extract this pattern.

Below is a similar example pattern (Pattern Example 3) in Ruby, a dynamically typed programming language that searches for all instances of function foo in the source code that return a literal string. Pattern Example 3 returns two different values/types based on the value of the argument that is passed to it.

def foo (arg)

arg==1?"error": arg end

Pattern Example 3

For dynamically typed languages, the types are not explicitly mentioned in the source code. Hence, we cannot directly infer them from the source code. Instead, we have to run an analysis on the PDG (as a lower bound) to extract all the return values from the function definitions in order to determine in which case a literal string is returned. That is, to extract a pattern like Pattern Example 3, the underlying program model must have the dynamic type information feature. PDG model 270 of FIG. 2 is sufficient to extract this pattern.

For cases where we have different return values and return types which can only be determined by means of the arguments of the function or the calling context, even the PDG is not sufficient as a program model, so that we would have to use the SDG which enables us to infer types across function boundaries and analyze the context from which a function is called.

Intraprocedural control-flow feature and interprocedural control-flow feature: The snippet below (Pattern Example 4) depicts a pattern that partially leaks a secret. In order to be able to infer what the conditions are for the secret being leaked, the program model has to provide intraprocedural control-flow information that orders all the statements and expressions based on the order of execution and highlights path conditions that lead to the call to fmt.Println that leaks a variable which is labeled as secret.

```
func foo( ) {
  secret := "a)d9fajk"
  for i := 0; i < len(secret); i++ {
    if i % 2 == 0 {
      fmt.Println(secret[i])
    }
  }
}
```
Pattern Example 4

To be able to extract a pattern like Pattern Example 4, the underlying program model must have the intraprocedural control-flow feature. The CFG model 220 of FIG. 2 is sufficient to extract this pattern.

The snippet below (Pattern Example 5) illustrates a case that requires a program model that is based on interprocedural analysis (including caller/callee relationships) where we are looking for a function foo that returns an error type that is unchecked on the call-site. This is another example where the complexity of the analysis and the required model is determined by the programming language under analysis, and, based on the language type (i.e., dynamic v. static). For the programming language Go, as a static language with a preference towards static dispatch, it would be sufficient to build a ICFG model to extract patterns like the one below (Pattern Example 5).

```
func foo( ) error {
  return fmt.Errorf("error")
}
_:=foo( )
```
Pattern Example 5

That is, to be able to extract a pattern like Pattern Example 5, the underlying program model must have the interprocedural control-flow feature. The ICFG model 250 of FIG. 2 is sufficient to extract this pattern.

Intraprocedural data-flow and interprocedural data-flow: Below is an example of a code snippet (Pattern Example 6) where a parameter that is passed to a function may flow to a database execute statement potentially leading to a SQL injection attack. In the example below there is a dataflow from the parameter input to the db.Execute sink.

```
func foo(input string) {
  db.Execute(input)
}
```
Pattern Example 6

That is, to be able to extract a pattern like Pattern Example 6, the program model must have the intraprocedural data-flow feature. The DD model 230 of FIG. 2 is sufficient to extract this pattern.

The example below (Pattern Example 7) is more complex because there is a data-flow across different functions which requires interprocedural data-flow analysis. Below is an example of an interprocedural data-flow pattern where we want to check whether user input (provided by the Source( ) function flows to a sensitive sink, Sink( )

```
func Source( ) string {
  return getParameter("input")
}
func Sink(var string) { }
Sink(Source( ))
```
Pattern Example 7

To be able to extract a pattern like Pattern Example 7, the program model must provide interprocedural control- and data-flow features. The SDG model 280 of FIG. 2 is a suitable model to detect the illustrated dataflow.

As explained previously, the linkage between features extracted from patterns, and program models that have such features (e.g., linkage between features and models for Pattern Examples 1-7 above) may be stored as model lookup data 351 in model lookup data store 140. In one embodiment, model lookup data 351 may be a lookup table that enables code scanner 130 to lookup for each identified/extracted feature for an input pattern, the best program model (e.g., high performance program model; optimized program model) that has such a feature. An example of model lookup data 351 stored in model lookup data store 140 (e.g., storing relationships between models shown in FIG. 2, and features corresponding to Pattern Examples 1-7 above) is shown below as Table 1.

TABLE 1

|  | Parse tree AST hierarchy | Static type information | Intra-procedural control-flow | Intra-procedural data-flow | Dynamic type information | Inter-procedural control flow | Inter-procedural data-flow |
| --- | --- | --- | --- | --- | --- | --- | --- |
| Parse Tree/AST | 1 | 1 | 1 | 1 | 1 | 1 | 1 |
| CFG | 0 | 0 | 1 | 1 | 1 | 1 | 1 |
| DD | 0 | 0 | 0 | 1 | 1 | 1 | 1 |
| CDG | 0 | 0 | 0 | 0 | 1 | 1 | 1 |
| PDG | 0 | 0 | 0 | 0 | 1 | 1 | 1 |
| CG | 0 | 0 | 0 | 0 | 0 | 1 | 1 |
| ICFG | 0 | 0 | 0 | 0 | 0 | 1 | 1 |
| SDG | 0 | 0 | 0 | 0 | 0 | 0 | 1 |

In Table 1, the rows denote different program models whereas the columns denote different features. That is, in Table 1, the rows represent feature requirements, i.e., different program models required to adequately satisfy a given feature. In Table 1, a cell is set to 1 if the feature (column) transitively requires the corresponding program model (row) and is set to 0 otherwise. Note that the list of features and program models listed in Table 1 is illustrative, and not restrictive or comprehensive. The purpose of Table 1 is to demonstrate an embodiment of model lookup data for a set of arbitrary features and models. A person having ordinary skill in the art will appreciate that additional or alternative features, and additional or alternative program models to satisfy the features may be added to columns and rows of Table 1, respectively. Examples of features that are not listed in Table 1 could include more specific programming language-based properties such as differentiation between static and dynamic languages (e.g., as mentioned in connection with Pattern Examples 3 and 5 above).

Returning to FIG. 3, pattern analyzer 320 performs a pre-analysis on patterns 315 to identify what features should be baked into (e.g., built into) the dynamic program model. Based on the pre-analysis, pattern analyzer 320 generates feature configuration data 328 (e.g., set of features extracted from patterns 315). More specifically, patterns 315 are input to parser module 322 of pattern analyzer 320. Parser module 322 can parse each of the input patterns 315 and generate pattern parse tree 324, i.e., a hierarchical representation of each pattern 315. That is, pattern parse tree 324 is a structural/hierarchical representation of the source code corresponding to each pattern 315. For example, if a pattern 315 would be formulated in the form of a SQL query, the parse tree 324 would provide the parse tree representation of the SQL query. In one embodiment, the adaptive program model generation methodology is independent from any specific programming language so any parser that can produce a parse tree from source code may be used. Parse trees 324 generated from input patterns 315 by parser module 322 are input to feature extraction module 326 which evaluates and analyzes pattern parse trees 324 to identify/extract corresponding features (e.g., aspects of the program to be tested).

Further, feature extraction module 326 unites the identified or extracted features corresponding to the patterns 315 into a set of features as feature configuration data 328, and outputs feature configuration data 328 to model builder 350. More specifically, feature extraction module 326 traverses pattern parse trees 324 to determine the type of information requested by the respective patterns 315. Based on this determination, feature extraction module 326 generates feature configuration data 328 (e.g., a set of features). Thus, if feature extraction module 326 determines that one or more of pattern definitions 315 require the "Parse Tree/AST hierarchy" feature, this information is included in feature configuration data 328.

Feature configuration data 328 may be a set union of all unique features that are extracted from the input patterns 315 (e.g., queries), and can be written as F:={$f_1, f_2, \ldots, f_N$}. For example, if one pattern 315 extracts information related to the "Parse Tree/AST hierarchy" feature, while another pattern 315 extracts information that requires "Intraprocedural Control-flow" feature, both of these features are recorded in the feature configuration as: F:={Parse Tree/AST hierarchy, Intraprocedural Control flow}.

In some embodiments, information linking specific patterns (e.g., patterns 315) to specific features may be predetermined and stored as feature lookup data (e.g., lookup table). The feature lookup data may thus indicate relationships between patterns 315 and corresponding features (e.g., aspects) that should be supported by the program model to be able to extract the respective patterns 315. Feature extraction module 326 may then utilize the feature lookup data to identify the corresponding feature for each pattern 315 to generate feature configuration data 328.

Model Builder 350 uses feature configuration data 328 to generate a dynamic program model 358 with a level of granularity demanded as per the set of features included in feature configuration data 328. The resulting program model 358 can be used for different purposes. In the embodiment shown in FIG. 3, program model 358 is used to identify code issues (e.g., insecure flows, secrets, coding standard violations) in source code 310 by inputting patterns 315 into pattern evaluation module 360, generating instances 370 of the input patterns 315, and analyzing the instances 370 for issues. As shown in FIG. 3, model builder 350 includes model configuration module 352 and compiler module 356. Model configuration module 352 receives as input, feature configuration data 328 (e.g., set of features) and receives model lookup data 351 from model lookup data store 140.

Based on the set of features included in feature configuration data 328, model configuration module 352 may perform a lookup operation to lookup corresponding program models from model lookup data 351 (e.g., Table 1 above) and dynamically select all program models required to satisfy the set of features in feature configuration data 328.

Continuing with the above exemplary model lookup data 351 shown in Table 1, and the example feature configuration F:={Parse Tree/AST hierarchy, Intraprocedural Control-flow}, since the feature "Intraprocedural Control-flow" requires the CFG model, which in turn depends on the Parse Tree/AST model, the model lookup operation by model configuration module 352 may yield corresponding data from model lookup data 351. For example, the columns in Table 1 could be represented as bit vectors so that model configuration module 352 may extract bit vector 11000000 for the "Intraprocedural Control-flow" feature (i.e., data corresponding to "Intraprocedural Control-flow" feature column in Table 1).

To determine (e.g., build, generate) a dynamic program model that appropriately satisfies all queries/patterns 315 input to code scanner 130, model builder 350 iterates over every feature $f_x$ in feature configuration F as feature configuration data 328, and unifies all identified models in model configuration M as model configuration data 354. In one embodiment, model configuration module 352 uses bit-vectors to implement this unification by looking up a bit vector $m_x$ that corresponds to feature $f_x$ and applying the equation M:=$M_x=M_{x-1}|m_x$ where "|" denotes "bitwise OR" starting with $M_0$=00000000, to generate model configuration data 354. In other words, model configuration module 352 identifies, condenses, and unifies the required program models in model configuration M as model configuration data 354, where model configuration M includes all program models to properly resolve all features required to extract all patterns/queries input as patterns 315.

Continuing with the above example, feature $f_1$=Parse Tree/AST hierarchy feature translates to model configuration $m_1$=10000000, and feature $f_2$=Intraprocedural Control flow translates to model configuration $m_2$=11000000. Model configuration module 352 would compute model configuration M of model configuration data 354 as follows:

M=00000000|10000000|11000000

M=11000000

Compiler module 356 takes as input the computed model configuration data 354 (e.g., M=11000000 above) and source code 310. And compiler module 356 uses the input model configuration data 354 to determine which dynamic program model 358 to generate from source code 310 so that the patterns/queries input at 315 can be properly satisfied. For example, model configuration M=11000000 requires the Parse Tree/AST and CFG models to be activated. For this purpose, with model configuration data 354 and source code 310 of the program as input, compiler module 356 invokes passes that are responsible for building program model(s) as configured by the input model configuration data 354 (e.g., build Parse Tree/AST and CFG models when model configuration M=11000000), and then combines the built models to a dynamic program model 358.

During subsequent analysis of the source code, code scanner 130 may activate pattern evaluation module 360 to extract patterns 315 from dynamic program model 358 input to pattern evaluation module 360 to generate instances 370 of patterns 315 to identify and report code issues.

Figure 4:
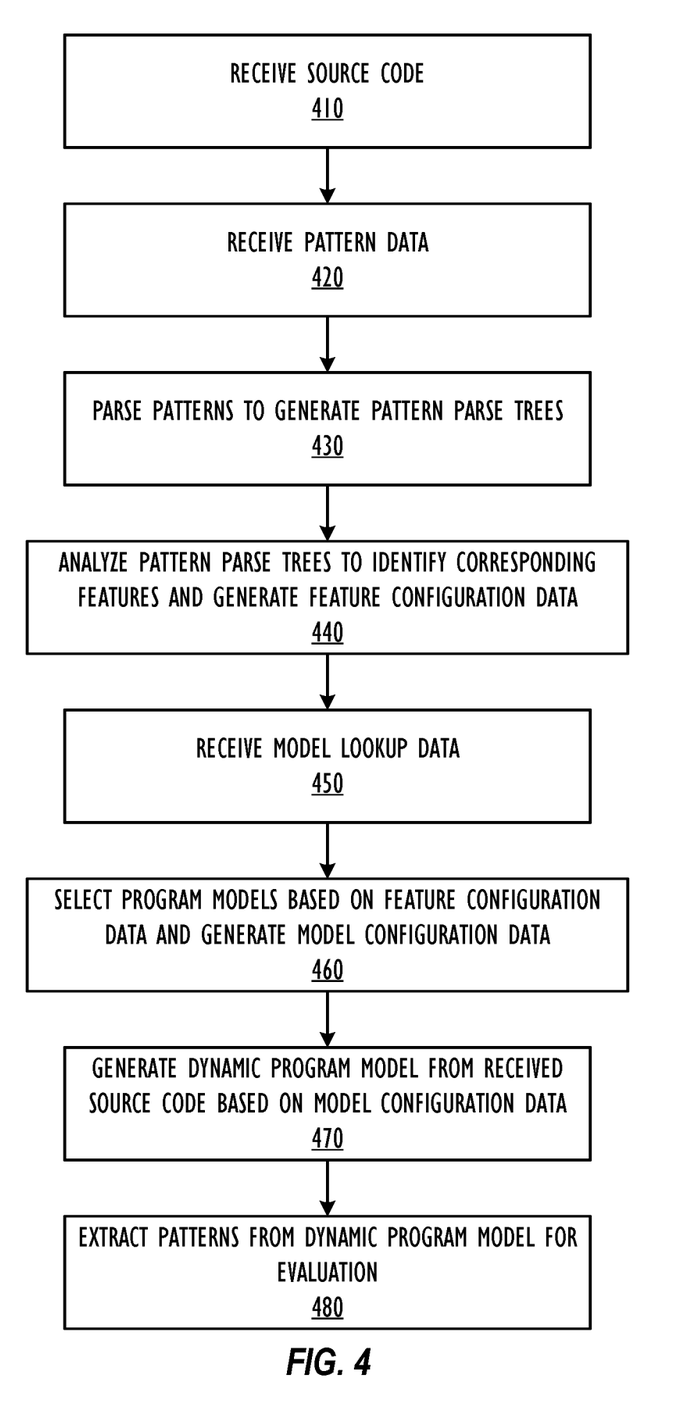
FIG. 4 is a flowchart of a method for adaptively generating a program model, according to one embodiment.

FIG. 4 is a flowchart of method 400 for adaptively generating a program model, according to one embodiment. The steps of FIG. 4 are illustrated from the perspective of the code scanner 130 performing method 400. However, some or all the steps (blocks) may be performed by other entities or components. In addition, some embodiments may perform the steps in parallel, perform the steps in different orders, omit one or more of the steps, or perform alternate or different steps.

In the embodiment shown in FIG. 4, method 400 begins at block 410 with code scanner 130 receiving source code 310 for the software project (e.g., by retrieving the source code from a source code repository 110). At block 420, code scanner 130 receives data corresponding to a set of predefined patterns that have been selected by a user (e.g., by selecting patterns from the source code 310 on one or more client devices 120) or selected automatically by the static analysis tool based on a type of test to be conducted. At block 430, parser module 322 of code scanner 130 parses each of the patterns received at block 420 and generates pattern parse trees.

At block 440, feature extraction module 326 of code scanner 130 evaluates and analyzes the pattern parse trees to identify/extract features corresponding to the set of patterns received at block 420. At block 440, feature extraction module 326 also generates feature configuration data by uniting the identified or extracted features corresponding to the patterns into a set of features (e.g., $F:=\{f_1, f_2, \ldots, f_N\}$). At block 450, model configuration module 352 of code scanner 130 receives model lookup data that links features extracted from patterns, and program models that have such features (e.g., by retrieving above-described Table 1 as model lookup data 351 from model lookup data store 140).

At block 460, model configuration module 352 of code scanner 130 dynamically selects all program models required to satisfy the patterns input at block 420 (e.g., models that satisfy each of the features in feature configuration $F:=\{f_1, f_2, \ldots, f_N\}$) by performing a lookup operation using the model lookup data received at block 450 to lookup, for each identified feature included in the feature set of the feature configuration data generated at block 440, respective program models. Model configuration module 352 at block 460 also generates model configuration data by iterating over each feature included in the feature set and uniting program models identified for the extracted features. Method 400 then proceeds to block 470 where compiler module 356 of code scanner 130 generates a dynamic program model from the source code received at block 410 based on the model configuration data generated at block 460 (e.g., model configuration M=11000000) so that all patterns received at block 420 can be properly satisfied. Method 400 may then proceed to subsequent analysis and reporting steps for testing source code received at block 410 for code issues. For example, at block 480, pattern evaluation module 360 of code scanner 130 may extract patterns (received at block 420) from the dynamic program model (generated at block 470) to generate instances of the patterns and identify code issues in the program based on the instances.

Figure 5:
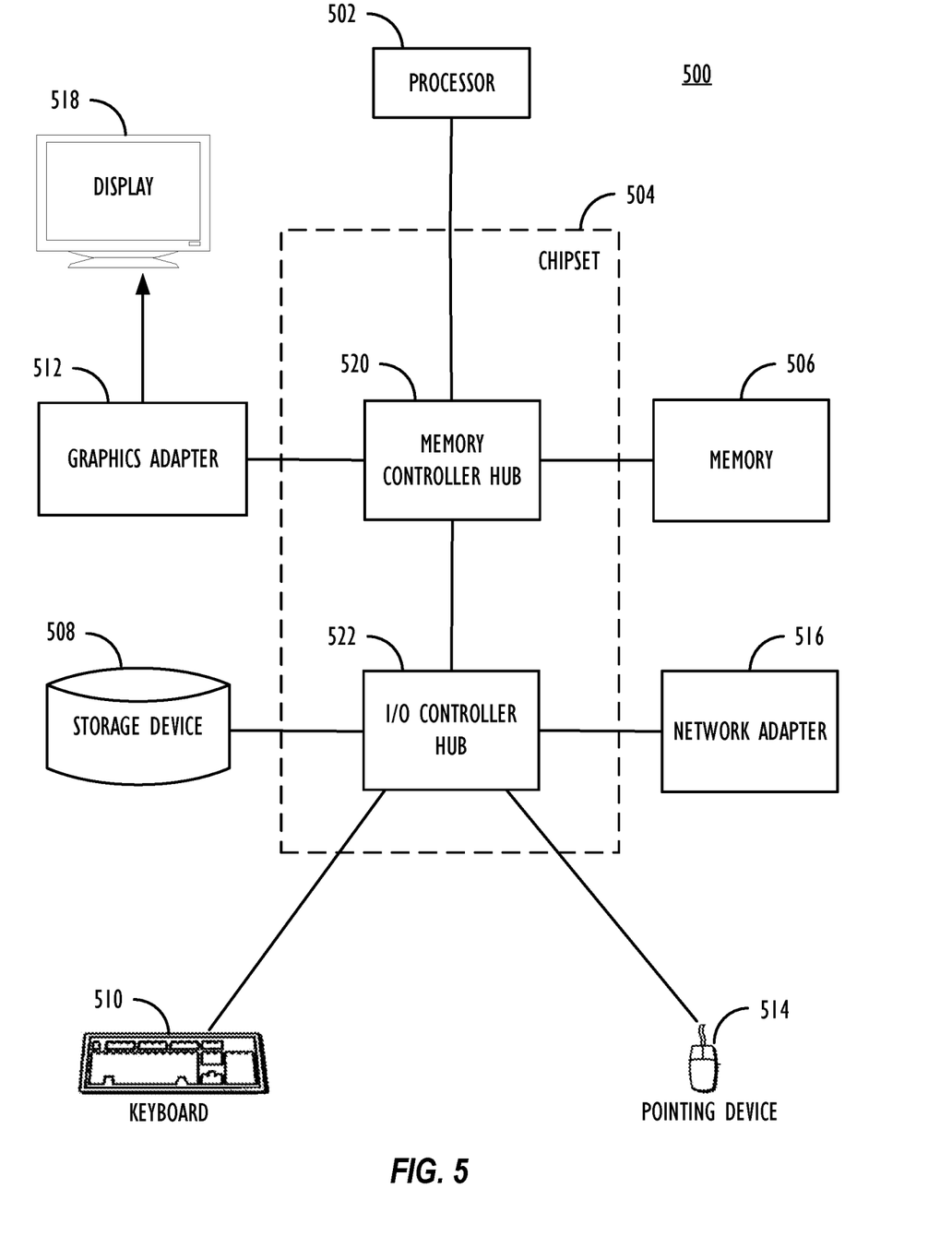
FIG. 5 is a block diagram illustrating an example computer suitable for use in the networked computing environment of FIG. 1, according to one embodiment.

FIG. 5 is a block diagram of an example computer 500 suitable for use as one or more client devices 120, or code scanner 130, or for hosting source code repository 110, or model lookup data store 140, or for implementing functions corresponding to method 400. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and may be used in combination with the keyboard 510 (which may be an on-screen keyboard) to input data into the computer system 500. The graphics adapter 512 displays images and other information on the display 518. The network adapter 516 couples the computer system 500 to one or more computer networks, such as network 150.

The types of computers used by the entities of FIGS. 1 and 3 can vary depending upon the embodiment and the processing power required by the entity. For example, a system hosting the source code repository 110 might include multiple blade servers working together to provide the functionality described while a client device 120 might be a desktop workstation or tablet. Furthermore, computers 500 can lack some of the components described above, such as keyboards 510, graphics adapters 512, and displays 518.

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. For example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for adaptively generating program models by running a pre-analysis on user-defined patterns. Thus, while particular embodiments and applications have been illustrated and described, it is to be understood that the described subject matter is not limited to the precise construction and components disclosed. The scope of protection should be limited only by any claims that issue.

What is claimed is:

1. A system for adaptively generating a program model, comprising:
   one or more processors; and
   memory operatively coupled to the one or more processors, the memory comprising instructions that, when executed by the one or more processors, cause the one or more processors to:
      receive source code of a program to be tested for code issues;
      receive a set of predefined patterns to be tested in the source code;
      generate feature configuration data by determining a set of features corresponding to the received set of predefined patterns;
      identify a set of program models by selecting, for each feature in the set of features, one or more program models from a plurality of program models that are needed to evaluate the feature;
      build a dynamic program model based on the identified set of program models, wherein the dynamic program model is adapted to resolve each of the patterns included in the received set of predefined patterns; and
      test the source code for code issues by extracting from the dynamic program model instances of each of the set of predefined patterns,
   wherein the instructions that cause the one or more processors to identify the set of program models comprise instructions that, when executed by the one or more processors, cause the one or more processors to:
      receive model lookup data indicating predefined relationships between a plurality of features and respective program models that are optimized to satisfy the plurality of features;
      perform, for each feature in the set of features, a model lookup operation using the received model lookup data to identify a corresponding program model that is optimized for satisfying the feature; and
      identify the set of program models based on the model lookup operation performed for each feature in the set of features.

2. The system of claim 1, wherein the dynamic program model is an optimized program model that does not have support for features other than the features included in the set of features.

3. The system of claim 1, wherein the instructions that cause the one or more processors to receive the set of predefined patterns comprise instructions that, when executed by the one or more processors, cause the one or more processors to, one of:
   receive data corresponding to the set of predefined patterns from one or more client devices based on one or more user operations; or
   automatically generate data corresponding to the set of predefined patterns based on a user operation on a client device to select an analytical approach.

4. The system of claim 1, wherein the instructions that cause the one or more processors to generate the feature configuration data comprise instructions that, when executed by the one or more processors, cause the one or more processors to:
   parse each of the patterns in the received set of predefined patterns to generate pattern parse trees; and
   analyze the pattern parse trees to extract the set of features.

5. The system of claim 1, wherein the instructions that cause the one or more processors to generate the feature configuration data comprise instructions that, when executed by the one or more processors, cause the one or more processors to:
   receive feature lookup data indicating predefined relationships between a plurality of features and respective exemplary patterns that can be resolved by the plurality of features;
   perform, for each pattern in the received set of predefined patterns, a feature lookup operation of identifying a corresponding feature from the received feature lookup data; and
   determine the set of features based on the feature lookup operation performed for each pattern in the received set of predefined patterns.

6. The system of claim 1, wherein the instructions that cause the one or more processors to identify the set of program models further comprise instructions that, when executed by the one or more processors, cause the one or more processors to:
   extract, from the model lookup data, a bit vector for each feature in the set of features, wherein each bit vector indicates the optimized program model for the feature; and
   generate a unified bit vector by unifying the plurality of bit vectors by performing a bitwise OR operation, wherein the unified bit vector represents the dynamic program model.

7. The system of claim 1, wherein the model lookup data is a lookup table that stores a relationship between a plurality of features and a plurality of program models, and wherein the lookup table indicates for each of the plurality of features, an optimal program model from among the plurality of program models that has support for the feature.

8. A method for adaptively generating a program model, comprising:

receiving source code of a program to be tested for code issues;

receiving a set of predefined patterns to be tested in the source code;

generating feature configuration data by determining a set of features corresponding to the received set of predefined patterns;

identifying a set of program models by selecting, for each feature in the set of features, a program model from among a plurality of program models that is optimized for the feature;

building a dynamic program model based on the identified set of program models, wherein the dynamic program model is adapted to resolve each of the patterns included in the received set of predefined patterns; and testing the source code for code issues by extracting from the dynamic program model instances of each of the set of predefined patterns, wherein identifying the set of program models comprises:

receiving model lookup data indicating predefined relationships between a plurality of features and respective program models that are optimized to satisfy the plurality of features;

performing, for each feature in the set of features, a model lookup operation using the received model lookup data to identify a corresponding program model that is optimized for satisfying the feature; and identifying the set of program models based on the model lookup operation performed for each feature in the set of features.

9. The method of claim 8, wherein the dynamic program model is an optimized program model that does not have support for features other than the features included in the set of features.

10. The method of claim 8, wherein receiving the set of predefined patterns comprises, one of:

receiving data corresponding to the set of predefined patterns from one or more client devices based on one or more user operations; or automatically generating data corresponding to the set of predefined patterns based on a user operation on a client device to select an analytical approach.

11. The method of claim 8, wherein generating the feature configuration data comprises:

parsing each of the patterns in the received set of predefined patterns to generate pattern parse trees; and analyzing the pattern parse trees to extract the set of features.

12. The method of claim 8, wherein generating the feature configuration data comprises:

receiving feature lookup data indicating predefined relationships between a plurality of features and respective exemplary patterns that can be resolved by the plurality of features;

performing, for each pattern in the received set of predefined patterns, a feature lookup operation of identifying a corresponding feature from the received feature lookup data; and determining the set of features based on the feature lookup operation performed for each pattern in the received set of predefined patterns.

13. The method of claim 8, wherein identifying the set of program models further comprises:

extracting, from the model lookup data, a bit vector for each feature in the set of features, wherein each bit vector indicates the optimized program model for the feature; and generating a unified bit vector by unifying the plurality of bit vectors by performing a bitwise OR operation, wherein the unified bit vector represents the dynamic program model.

14. The method of claim 8, wherein the model lookup data is a lookup table that stores a relationship between a plurality of features and a plurality of program models, and wherein the lookup table indicates for each of the plurality of features, an optimal program model from among the plurality of program models that has support for the feature.

15. A non-transitory computer readable medium having a computer-executable program stored thereon, the program comprising instructions that, when executed, cause a computing system to:

receive source code of a program to be tested for code issues;

receive a set of predefined patterns to be tested in the source code;

generate feature configuration data by determining a set of features corresponding to the received set of predefined patterns;

identify a set of program models by selecting, for each feature in the set of features, a program model from among a plurality of program models that is optimized for the feature;

build a dynamic program model based on the identified set of program models, wherein the dynamic program model is adapted to resolve each of the patterns included in the received set of predefined patterns; and test the source code for code issues by extracting from the dynamic program model, instances of each of the set of predefined patterns, wherein the instructions that cause the computing system to identify the set of program models comprise instructions that, when executed, cause the computing system to:

receive model lookup data indicating predefined relationships between a plurality of features and respective program models that are optimized to satisfy the plurality of features;

perform, for each feature in the set of features, a model lookup operation using the received model lookup data to identify a corresponding program model that is optimized for satisfying the feature; and identify the set of program models based on the model lookup operation performed for each feature in the set of features.

16. The non-transitory computer readable medium of claim 15, wherein the dynamic program model is an optimized program model that does not have support for features other than the features included in the set of features defining the feature configuration data.

17. The non-transitory computer readable medium of claim 15, wherein the instructions that cause the computing system to identify the set of program models comprise instructions that, when executed, cause the computing system to:

extract, from the model lookup data, a bit vector for each feature in the set of features defining the feature configuration data, wherein each bit vector indicates the optimized program model for the feature; and generate a unified bit vector by unifying the plurality of bit vectors by performing a bitwise OR operation, wherein the unified bit vector represents the dynamic program model.

18. The non-transitory computer readable medium of claim 15, wherein the model lookup data is a lookup table that stores a relationship between a plurality of features and a plurality of program models, and wherein the lookup table indicates for each of the plurality of features, an optimal program model from among the plurality of program models that has support for the feature.

* * * * *

UNITED STATES PATENT AND TRADEMARK OFFICE
CERTIFICATE OF CORRECTION

PATENT NO. : 11,983,091 B2
APPLICATION NO. : 17/705190
DATED : May 14, 2024
INVENTOR(S) : Thome et al.

It is certified that error appears in the above-identified patent and that said Letters Patent is hereby corrected as shown below:

In the Claims

In Column 17, Claim 1, Line 58, delete "model" and insert -- model, --, therefor.

In Column 19, Claim 8, Line 20, delete "model" and insert -- model, --, therefor.

Signed and Sealed this
First Day of October, 2024

Katherine Kelly Vidal
*Director of the United States Patent and Trademark Office*